US010552439B2

(12) United States Patent
Jiang et al.

(10) Patent No.: US 10,552,439 B2
(45) Date of Patent: Feb. 4, 2020

(54) GRID FORMAT DATA VIEWING AND EDITING ENVIRONMENT

(71) Applicant: Informatica LLC, Redwood City, CA (US)

(72) Inventors: Lin Jiang, Palo Alto, CA (US); Ratheesh Narayanan, Sunnyvale, CA (US); Liam Friedland, Redwood City, CA (US)

(73) Assignee: Informatica LLC, Redwood City, CA (US)

( * ) Notice: Subject to any disclaimer, the term of this patent is extended or adjusted under 35 U.S.C. 154(b) by 956 days.

(21) Appl. No.: 14/706,828

(22) Filed: May 7, 2015

(65) Prior Publication Data

US 2015/0324437 A1  Nov. 12, 2015

Related U.S. Application Data

(60) Provisional application No. 61/991,551, filed on May 11, 2014.

(51) Int. Cl.
*G06F 16/25* (2019.01)
*G06F 16/22* (2019.01)

(52) U.S. Cl.
CPC .......... *G06F 16/254* (2019.01); *G06F 16/221* (2019.01)

(58) Field of Classification Search
CPC ........... G06F 17/30563; G06F 7/30563; G06F 17/30303; G06F 17/30315; G06F 16/254; G06F 16/221
See application file for complete search history.

(56) References Cited

U.S. PATENT DOCUMENTS

| 7,725,498 B2 | 5/2010 | Barsness et al. |
| 8,200,614 B2 * | 6/2012 | Syed ................. G06F 17/30442 707/602 |
| 8,825,695 B2 * | 9/2014 | Studer ................ G06F 17/2264 707/769 |
| 2002/0161799 A1 | 10/2002 | Maguire, III et al. |
| 2009/0276449 A1 * | 11/2009 | Syed ................. G06F 17/30442 |

(Continued)

OTHER PUBLICATIONS

European Extended Search Report, European Application No. 15167202.9, dated Sep. 30, 2015, 10 pages.

(Continued)

*Primary Examiner* — Cam Y T Truong
(74) *Attorney, Agent, or Firm* — Amardeep S. Grewal; Reed Smith LLP

(57) ABSTRACT

A data profiling server extracts data from multiple data sources and stores the extracted data in a target data store. Validation functions are performed on the extracted to determine whether the data conforms to validation rules associated with the target data store and/or business logic definitions. For data that does not conform to the validation rules, the data profiling server identifies recommended transformations to be applied to the data to correct any errors that cause the data to not conform with the validation rules. A data profiling application presents to a user the data extracted from the multiple data sources in a grid structure. The grid structure also includes error indicators identifying the data that does not conform to the validation rules and specifies the recommended transformations identified by the data profiling server.

21 Claims, 15 Drawing Sheets

(56) References Cited

U.S. PATENT DOCUMENTS

| | | | |
|---|---|---|---|
| 2010/0205521 A1* | 8/2010 | Folting | G06F 17/246 |
| | | | 715/227 |
| 2011/0191303 A1* | 8/2011 | Kaufman | G06F 17/30286 |
| | | | 707/684 |
| 2012/0173226 A1 | 7/2012 | McEvoy et al. | |
| 2012/0265727 A1* | 10/2012 | Naryzhnyy | G06F 17/30563 |
| | | | 707/602 |
| 2013/0159247 A1* | 6/2013 | Engelko | G06F 17/30309 |
| | | | 707/609 |
| 2013/0346429 A1 | 12/2013 | Bratz et al. | |
| 2014/0046927 A1 | 2/2014 | Nelke et al. | |

OTHER PUBLICATIONS

European Extended Search Report, European Application No. 15167219.3, dated Oct. 1, 2015, 10 pages.

Raman, V. et al., "Potter's Wheel: An Interactive Data Cleaning System," Proceedings of the 27$^{th}$ International Conference on Very Large Data Bases, Aug. 11-Sep. 14, 2001, pp. 381-390, [Online] [Retrieved on Sep. 16, 2015] Retrieved from the Internet<URL:http://www.vldb.org/conf/2001/P381.pdf>.

Scaffidi, C. et al., "Topes: Reusable Abstractions for Validating Data," ACM/IEEE 30$^{th}$ International Conference on Software Engineering, May 10, 2008, pp. 1-10.

\* cited by examiner

In-cell Transformation Control 516

FIG. 7B

GRID FORMAT DATA VIEWING AND EDITING ENVIRONMENT

CROSS-REFERENCE TO RELATED APPLICATION

This application claims a benefit of, and priority to, U.S. Patent Application No. 61/991,551, entitled "Data Viewing and Editing Environment with Refinement Suggestions" and filed on May 11, 2014. The content of this application is incorporated by reference in its entirety.

BACKGROUND

1. Field of Disclosure

The disclosure generally relates to extract, transform and load data processes and, more specifically, to displaying data extracted from data sources in a grid format data viewing and editing environment.

2. Background Information

Data from multiple external data sources typically transitions through an extract, transform and load (ETL) process when being ingested into an internal system. As a part of the ETL process, the data is (i) extracted, (ii) transformed according to business requirements and requirements of the internal data source, and (iii) loaded into a target data store of the internal system. While some parts of the ETL process can be automated, large parts of the process still require human intervention, especially when transforming extracted data to conform to business logic or correcting errors that were introduced as a result of the ingestion. The tools available to the data analysts who perform tasks related to the ETL process typically provide a low-level view into the internal data source that requires knowledge of the internal structure of the data source and data query languages, such as structured query language (SQL). Because of the vast amounts of data that are involved in a single ETL process, performing tasks related to the ETL with tools that are unintuitive and require specialized knowledge makes the tasks cumbersome and time consuming.

SUMMARY

A data profiling server extracts data from multiple data sources and stores the extracted data in a target data store. Validation functions are performed on the extracted data to determine whether the data conforms to validation rules associated with the target data store and/or business logic definitions. For data that does not conform to the validation rules, the data profiling server identifies recommended transformations to be applied to the data to correct any errors that cause the data to not conform with the validation rules. A data profiling application presents to a user the data extracted from the multiple data sources along with error indicators identifying the data that does not conform to the validation rules. The data profiling application also presents the recommended transformations identified by the data profiling server and also allows the user to specify additional transformations.

In operation, the data profiling application presents the data to the user in an easily-consumable grid structure. Each column in the grid structure is associated with a different column of a table in the target data store that stores the data extracted by the data profiling server. Similarly, each row in the grid structure is associated with a different row of the table. Consequently, an intersection of a column and a row in the grid structure, a grid cell, includes a value corresponding to a data field of the table. The grid structure includes different types of indicators and transformation controls that enable the user to understand and modify the values included in the grid structure. For example, the grid structure indicates, for each grid column, whether the grid column includes data handling errors and, if so, if any recommended transformations were identified by the data profiling server. The grid structure also allows the user to select, specify and apply the transformations to the data in the grid structure in a single editing environment, i.e., without navigating away from the grid structure.

For a grid column to which transformations have been applied, the data profiling application manages transformation states for the grid column. Each transformation state is associated with a particular transformation applied to the grid column and specifies the values in the grid column after the transformation was applied. The data profiling application, upon user request, generates a transformation history view with a grid column based on the transformation states. The transformation history view illustrates how the grid column and values therein have transformed over time. In an embodiment, the transformation history view illustrates a summary of all transformations performed on the grid structure over time.

With the techniques described herein, large amounts of data and the errors and transformations associated therewith are presented in an intuitive and easy to consume environment. Further, with the techniques described herein, a data analyst conducting a data profiling operation can quickly identify errors and inconsistencies in vast amounts of data and take action to rectify the errors and inconsistencies without needing specialized knowledge on the structure of the data or how to manipulate the data.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 4B illustrates an example of an error summary associated with the grid column of FIG. 4A according to one embodiment.

FIG. 5A illustrates a grid column summary control provided by the transformation UI module in the grid column summary according to one embodiment.

FIG. 5B illustrates a transformation control provided by the transformation UI module according to one embodiment.

FIG. 5D illustrates an in-cell transformation control provided by the transformation UI module according to one embodiment.

FIG. 7B illustrates the grid interface after the merge transformation specified in FIG. 7A is applied according to one embodiment.

DETAILED DESCRIPTION

System Architecture

Figure 1:
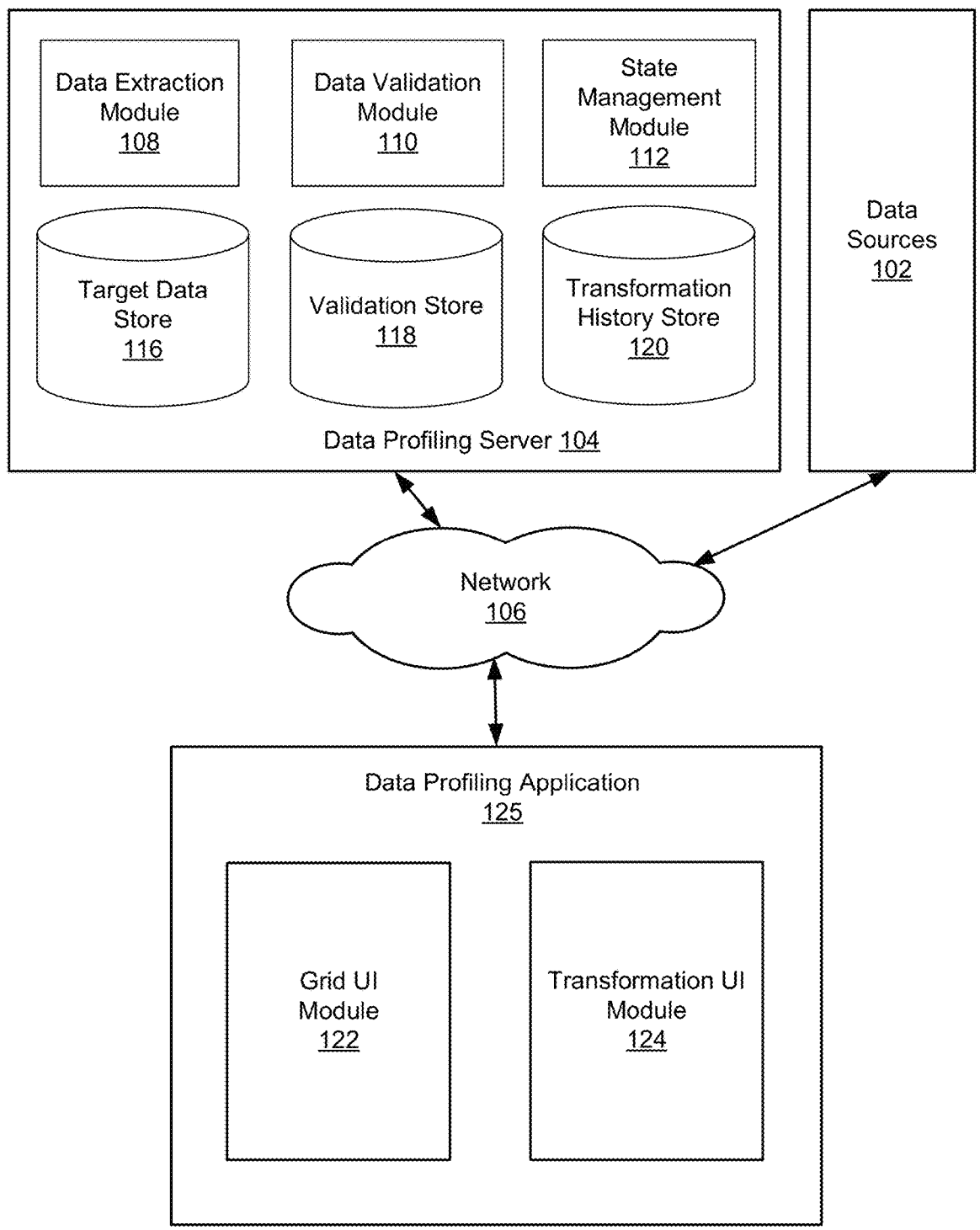
FIG. 1 is a high-level block diagram of a computing environment for profiling and transforming data extracted from one or more data sources according to one embodiment.

FIG. 1 is a high-level block diagram of a computing environment 100 for profiling and transforming data extracted from one or more data sources 102 according to one embodiment. As shown, the computing environment 100 includes data sources 102, a data profiling server 104 and a data profiling application 125.

The data sources 102 (also individually referred to herein as "data source 102") include one or more systems for managing data. Each data source 102 stores data according to a database schema. In one embodiment, data storage schemas across different data sources may vary significantly even when storing the same type of data. Each data source 102 provides a channel for accessing and updating data stored within the data source 102. Data in a data source 102 may be associated with users, groups of users, entities, and/or workflows. For example, a data source 102 may be a customer relationship management (CRM) system or a human resource (HR) management system that stores data associated with all individuals associated with a particular entity.

The data profiling server 104 extracts data from the data sources 102, processes the data according to a target storage schema, and provides the processed data to the data profiling application 125 so that the data may be displayed to and manipulated by a user. To perform these functions, the data profiling server 104 includes a data extraction module 108, a data validation module 110, and a state management module 112. Further, to store data related to these functions, the data profiling server 104 includes a target data store 116, validation store 118, and a transformation history store 120. Each of these components is described in greater detail below. These modules provide specific program code to perform the operations and function described herein, and are not components of a generic computer system. In addition, the operations described herein are necessarily executed by a computer system under program code, and cannot be performed by mental steps in the human mind in any practical embodiment appreciated by those of skill in the art.

The data extraction module 108 comprises program code configured to identify data in the data sources 102 that is to be extracted, retrieve that data from the data sources 102 and store the data in the target data store 116, and is one means for performing this function. In operation, the data extraction module 108 identifies one or more data sources 102 from which to extract data. The data extraction module 108 also identifies the specific data stored in the identified data sources 102 that is to be extracted. The identification of the data sources 102 and/or the specific data stored therein may be made based on instructions received from a user conducting a data profiling operation. Alternatively, such identification may be made based on one or more business logic definitions that specify external data sources from which to extract data.

The data extraction module 108 comprises program code configured to extract the identified data from the data sources 102 over the data access channels provided by the data source 102. In one embodiment, a data access channel is a secure data transfer protocol that allows the data extraction module 108 to communicate securely with a data source 102 to retrieve data from the data source 102. Once the data is extracted from the data source 102, the data extraction module 108 stores the data in the target data store 116 based on a logical data map. The logical data map describes the relationship between each of the internal schemas of the identified data sources 102 and the schema of the target data store 116 ("the target schema"). Specifically, the logical data map maps each column in a table of the internal schema of a data source 102 to a column of the target schema. In one embodiment, the data extraction module 108 generates the logical data map based on business logic received from a user conducting a data profiling operation. In alternate embodiments, the data extraction module 108 receives the logical data map from the user.

The data validation module 110 comprises program code configured to process the data extracted from the data sources 102 and stored in the target data store 116 to identify errors in the data, and is one means for performing this function. In operation, for each column in the target data store 116 that stores extracted data, the data validation module 110 performs one or more validation functions on the data fields in the column to identify values in the data fields that contain errors. If the data validation module 110 identifies data fields having errors, then the data validation module 110 optionally determines transformations that may be applied to the values in the data fields to correct the identified errors.

Each validation function performed by the data validation module 110 to identify errors is associated with a validation rule. Validation rules may be specified by the user conducting a data profiling operation. One validation rule specifies that NULL is an unacceptable value in a data field. Therefore, if a data field in a column stores a NULL value, then the data field is identified as containing an error. A second validation rule requires compliance with expected values for a given column. Therefore, if a data field in a column stores data a value that is inconsistent with the expected values specified for that column, then the data field is identified as having an error. For example, for a gender column, if a data field stores any data other than 'M' or 'F,' then the data field is identified as having an error.

A third validation rule requires compliance with the maximum/minimum data lengths for a given column. Therefore, if a data field in a column stores a value that is longer or shorter than the length specified for that column, then the data field is identified as having an error. Keeping the gender column example, if the length specified for the column indicates one character, then the data field is identified as having an error if the data field stores any data other than 'M' or 'F.' In this example, the data field column is identified as having an error even when the value specifies 'Male' or 'Female.'

A fourth validation rule requires conforming to data patterns associated with a given column. In operation, for a given column, the data validation module 110 determines a pattern associated with the column that indicates how values in that column should be formatted. In one embodiment, the data validation module 110 determines the pattern based on the schema of the target data store 116. In an alternative embodiment, the pattern is provided by the user conducting the data profiling operation. In another alternate embodiment, the pattern is determined based on a pattern followed by a majority of the data fields in the column. If a data field in a column stores data that does not conform to a pattern associated with the column, then the data field is identified as having an error.

The data validation module 110 stores in the validation store 118 a validation status for each data field of a column on which the validation functions are performed. The validation status of a given data field indicates whether the data field contain errors. Further, if a data field contains an error, the validation status indicates the validation rule(s) that were violated resulting in the identification of the error.

For each error identified, the data validation module 110 optionally determines a transformation that may be performed on the data field or a set of data fields to correct the error. In doing so, the data validation module 110 determines how to transform the value in a data field to comply with the validation rule(s) that were violated. In some cases, the transformation involves modifying the data in the data field to comply with the length, expected values or formatting validation rules. For example, for a single character length gender data field in the target data store 116, a transformation that modifies data in the data field from 'Male' to 'M' makes the data field comply with the validation rules. In other cases, the transformation involves filling the data field with data stored in other data fields or splitting the data in the data fields into multiple portions and storing only one of those portions in the data field and the remaining portions in other data fields. For example, a full name, 'John Smith' retrieved from a data source 102 may be incorrectly stored in a 'First Name' data field in the target data store 116. A split transformation splits 'John Smith' into two portions, 'John' and 'Smith.' John' can then be stored in the 'First Name' data field in compliance with the validation rules. In such an example, the second portion, 'Smith' may be stored in a 'Last Name' data field in the target data store 116 that was previously NULL (and, therefore, also in violation of another validation rule).

The data validation module 110 stores the transformations, if any, determined for each data field in the validation store 118. In some embodiments, the data validation module 110 automatically applies the transformations to the data fields in the target data store 116. In alternate embodiments, the data validation module 110 performs the transformation upon user instruction (as discussed below in conjunction with the data profiling application 125).

The state management module 112 comprises program code configured to track and store in the transformation history store 120 the state(s) of data fields in the target data store 116 as one or more transformations are applied to the data fields, and is one means for performing this function. In operation, when a transformation is applied to a data field, the state management module 112 stores in the transformation history store 120 the particular transformation that was applied to the data field. Therefore, the transformations applied to the data field over time are captured in the transformation history store 120 and the state of the data field before or after any particular transformation can be recreated.

The data profiling application 125 comprises program code configured to enable users to visualize data extracted from the data sources 102 by the data profiling server 104 and select and specify transformations to be performed on the data, and is one means for performing this function. To perform these functions, the data profiling application 125 includes a grid user interface (UI) module 122 and a transformation UI module 124. Each of these components is described in greater detail below in conjunction with the flow diagram of FIG. 2 and the user interface examples illustrated in FIGS. 3-8. The data profiling application 125 may be a desktop application, a mobile application or web-based application. In various embodiment, the data profiling application 125 is device agnostic.

Figure 2:
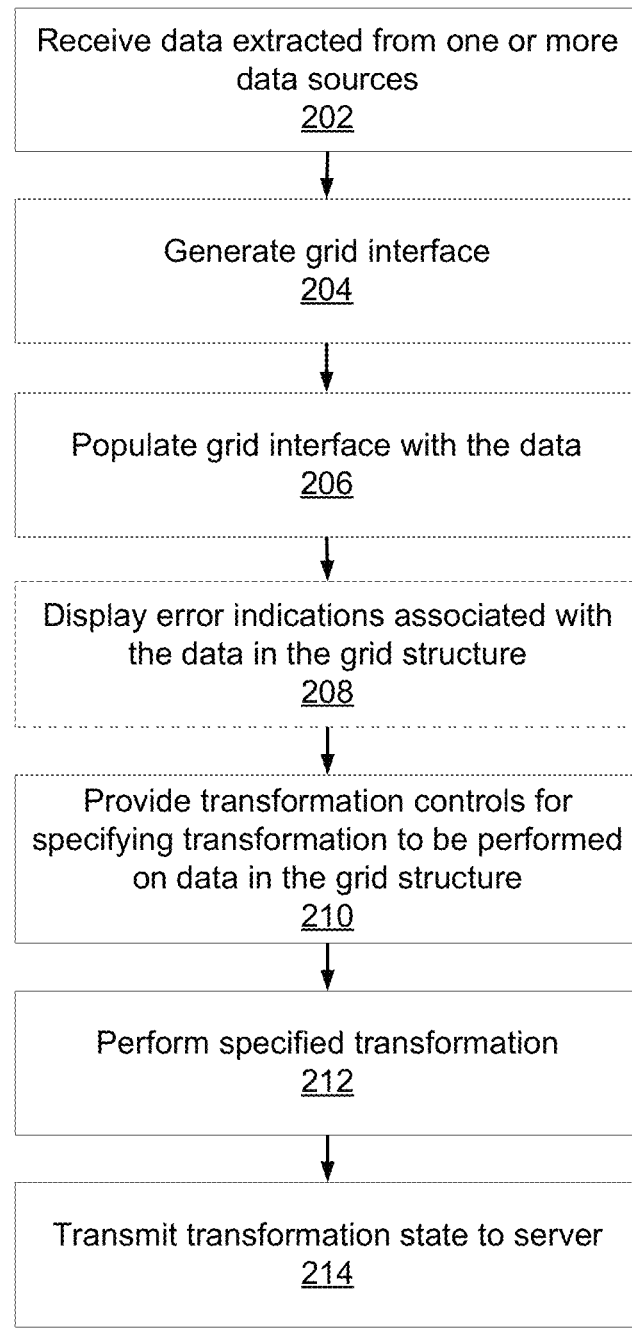
FIG. 2 is a flow diagram illustrating steps performed by the data profiling application according to one embodiment.

FIG. 2 is a flow diagram illustrating steps performed by the data profiling application 125 according to one embodiment. In some implementations, the steps are performed in an order other than the order presented in FIG. 2, and in other implementations, additional or alternative steps may be performed.

For a particular data profiling operation, the method begins by the grid UI module 122 receiving 202 from the data profiling server 104 data stored in a given table of the target data store 116 ("the server table"). The data is extracted from one or more data sources 102 in associated with the data profiling operation. The grid UI module 122 generates 204 a grid interface that includes grid columns corresponding to the columns in the server table and grid rows corresponding to rows in the server table. The grid interface also includes a grid header for presenting metadata associated with each grid column. The grid UI module 122 populates 206 the grid interface with the data received from the data profiling server 104. In operation, each grid row includes a grid cell corresponding to each grid column, and each grid cell corresponds to a given data field of the server table. The grid UI module 122 populates 206 each grid cell with the value included in the corresponding data field of the server table. Steps 206-214 are repeatedly performed as the grid interface continues to be populated with new or updated data.

Figure 3:
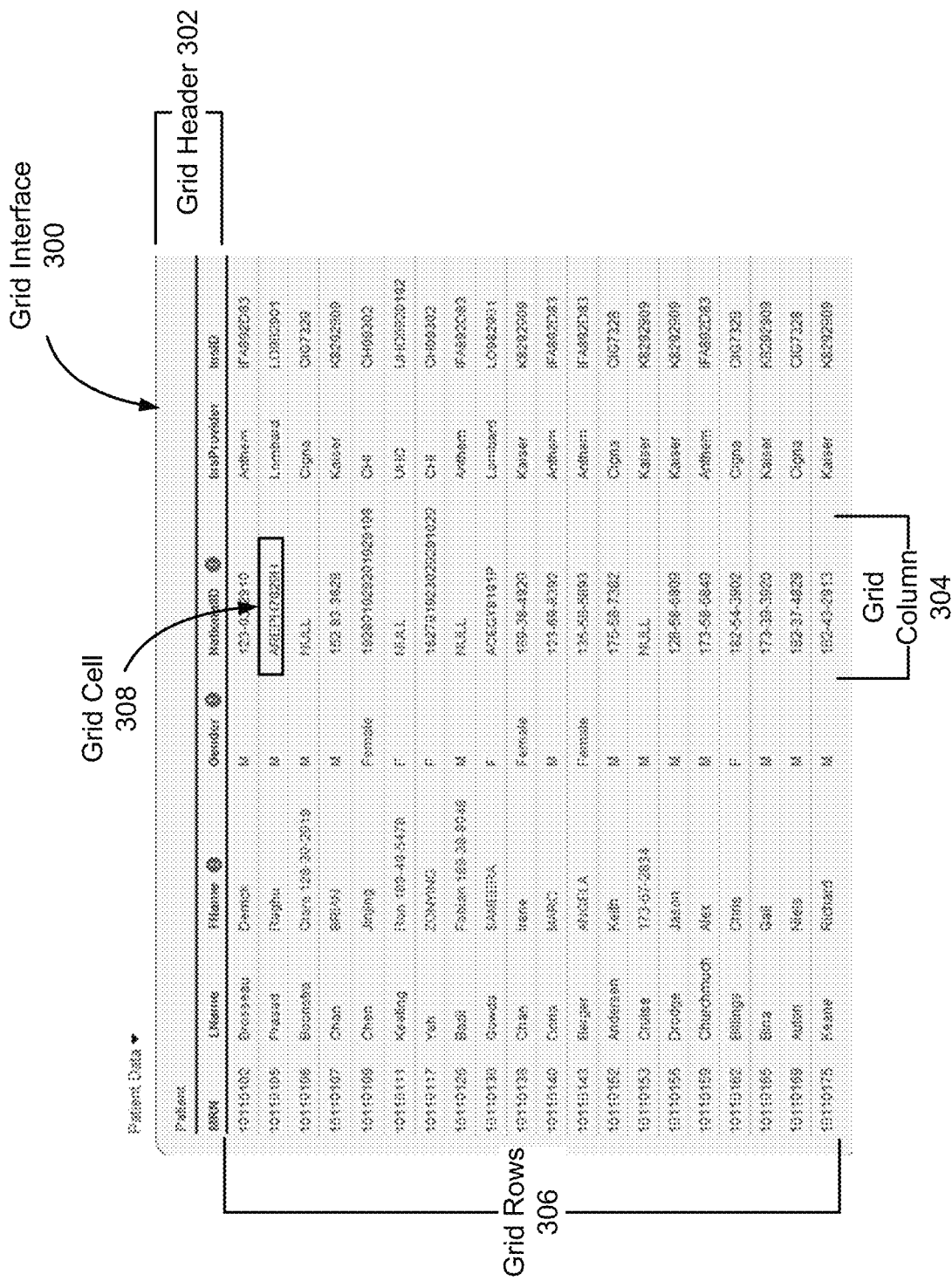
FIG. 3 illustrates an example of a grid interface generated by the grid UI module according to one embodiment.

FIG. 3 illustrates an example of a grid interface 300 generated by the grid UI module 122 according to one embodiment. The grid interface 300 is populated with data extracted from one or more data sources 102. As shown, the grid interface 300 includes a grid header 302, a grid column 304, grid rows 306, and a grid cell 308 included in the grid column 304. The grid header 302 specifies names associated with the different grid columns. For example, the grid header 302 specifies 'National ID' as the column name for the grid column 304. Further, the values in the grid cells, including grid cell 308, are populated based on values stored in corresponding data fields in a patient table stored in the target data store 116.

Returning to FIG. 2, the grid UI module 122 displays 208 error indications associated with values included in grid cells of the grid structure. More specifically, the grid UI module 122 receives from the data profiling server 104 the validation status for each data field in the server table. As discussed above, each data field corresponds to a grid cell in a grid column of the grid interface. If a grid column includes at least one grid cell that corresponds to a data field having a validation status indicating errors, then the grid UI module 122 displays an error indicator associated with the grid column. In one embodiment, the error indicator is displayed in the grid header of the grid interface. The grid UI module 122 may optionally highlight the individual grid cells that correspond to data fields having a validation status indicating errors.

Figure 4A:
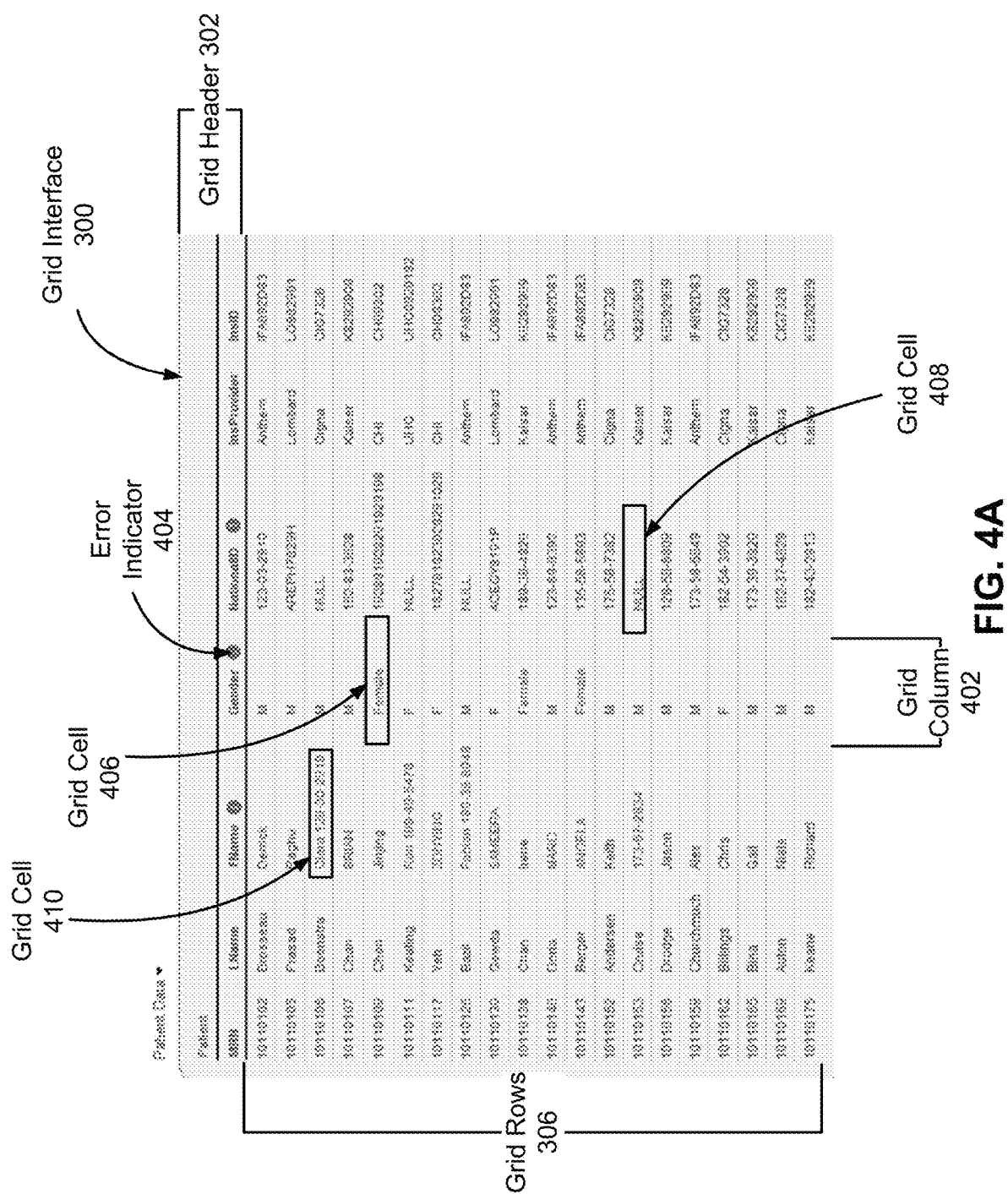
FIG. 4A illustrates an example of error indications displayed on the grid structure of FIG. 3 according to one embodiment.

FIG. 4A illustrates an example of error indications displayed on the grid structure 300 of FIG. 3 according to one embodiment. As shown, the grid header 302 includes an error indicator 404 indicating that grid column 402 includes grid cells that correspond to data fields having a validation status indicating errors. In addition, grid cell 406 is individually highlighted as having an error. In the illustrated example, grid cell 406 is highlighted as having an error because the value 'Female' violates the expected value, maximum length, and the pattern matching validation rules discussed above. Similarly, grid cell 408 is also highlighted as having an error because the value NULL violates the NULL being an unacceptable value validation rule discussed above. Further, grid cell 410 is highlighted as having an error because the value 'Clara 128-30-2919' violates the pattern of values expected for the 'First Name' column.

Figure 4B:
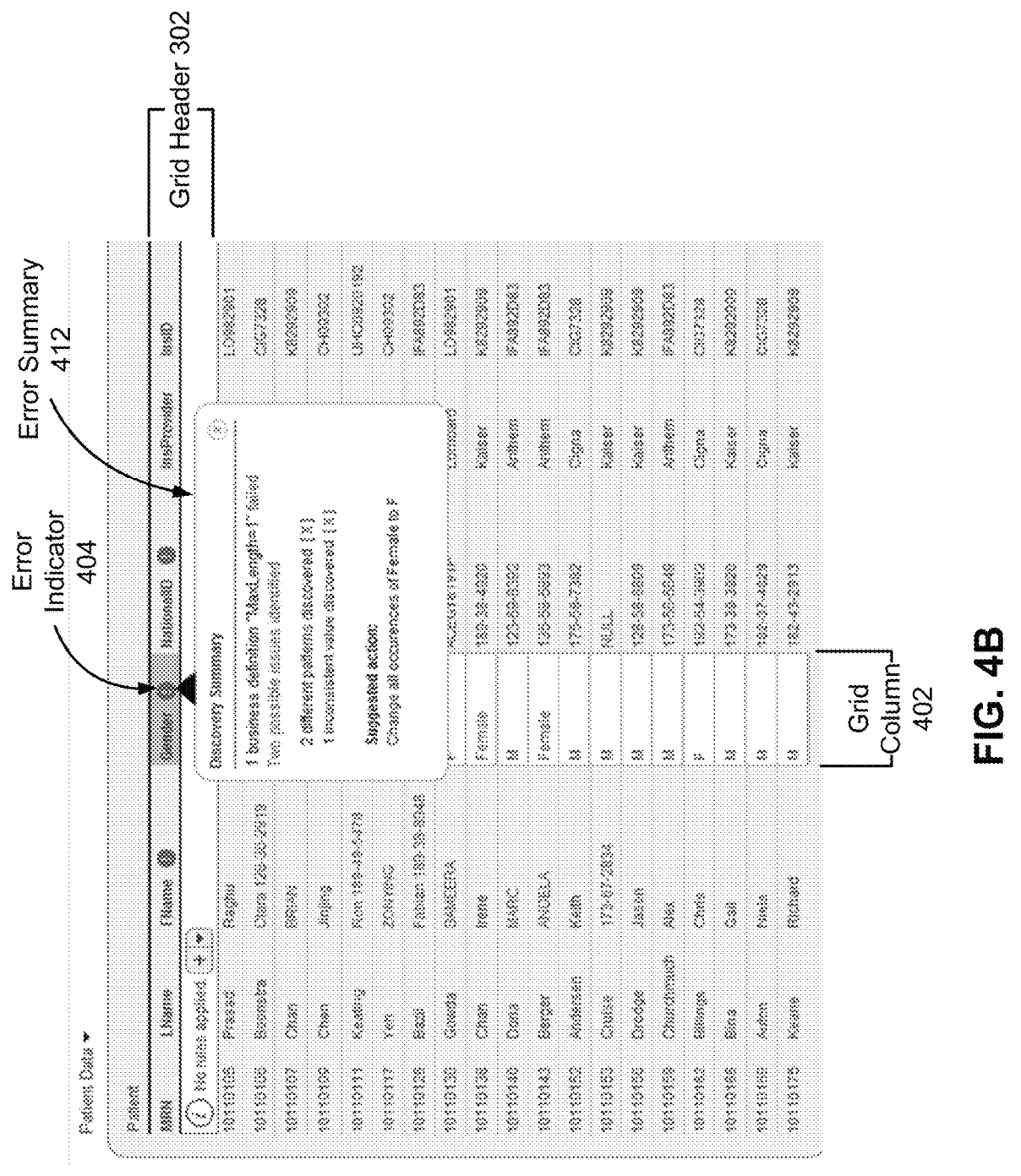

FIG. 4B illustrates an example of an error summary 412 associated with the grid column 402 of FIG. 4A according to one embodiment. In operation, when a user interacts with the error indicator 404, by clicking on the error indicator 404 for example, the grid UI module 122 generates the error summary 412 associated with the grid column 402. The error summary 408 includes a summary of the errors identified by the data validation module 110 for the data fields in the column of the server table corresponding to the grid column 402 ("the corresponding column"). Specifically, the error summary 408 specifies the validation rules that are violated by data fields in the corresponding column as specified by the validation statuses of the data fields. The error summary 408 also specifies any transformations identified by the data validation module 110 that can be applied to the corresponding column or the data fields therein to correct the errors.

Figure 4C:
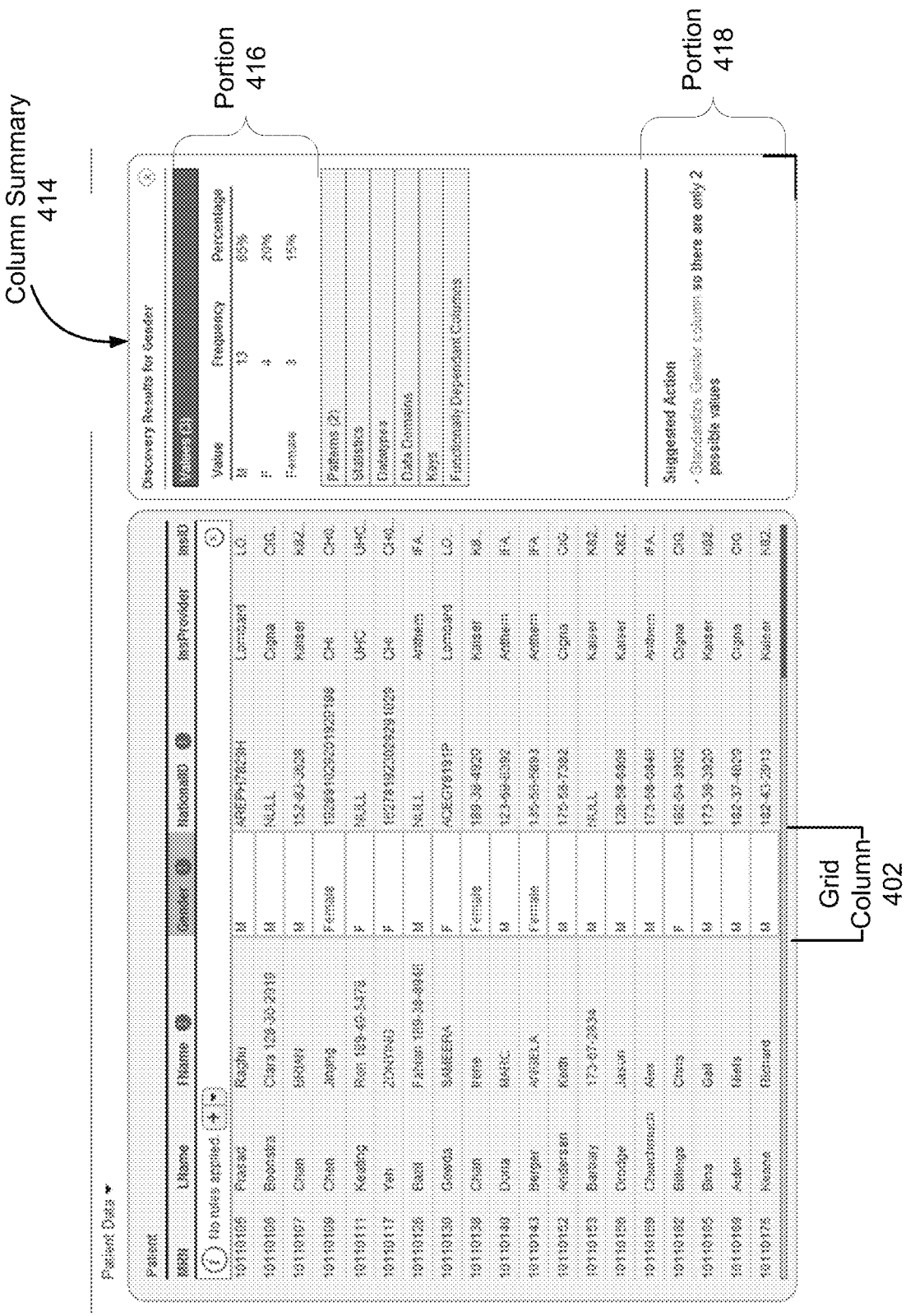
FIG. 4C illustrates an example of a grid column summary associated with the grid column of FIG. 4A according to one embodiment.

FIG. 4C illustrates an example of a grid column summary 414 associated with the grid column 402 of FIG. 4A according to one embodiment. In operation, when a user interacts with the grid column 402, by clicking on the portion of the grid header 302 associated with the grid column 402 for example, the grid UI module 122 generates the grid column summary 414 associated with the grid column 402. The grid column summary 410 includes a summary of the values included in the grid cells of the grid column 402, the 'Gender' column. Specifically, the grid column summary 414 specifies in portion 416 the different values included in the grid cells as well as the occurrence rates of those values in the grid cells. In the illustrated example, the portion 416 specifies that three different values appear in the grid column 402: 'M,' 'F,' and 'Female.' 'Female' is highlighted in portion 416 to indicate that grid cells having this value correspond to data fields of the server table having validation statuses that indicate errors. The grid column summary 414 also specifies in portion 418 any transformations identified by the data validation module 110 that can be applied to the column or the data fields therein to correct the errors. In the illustrated example, the portion 418 specifies that transforming the 'Gender' column such that there are only two possible values in the data fields would correct the identified errors.

Figure 4D:
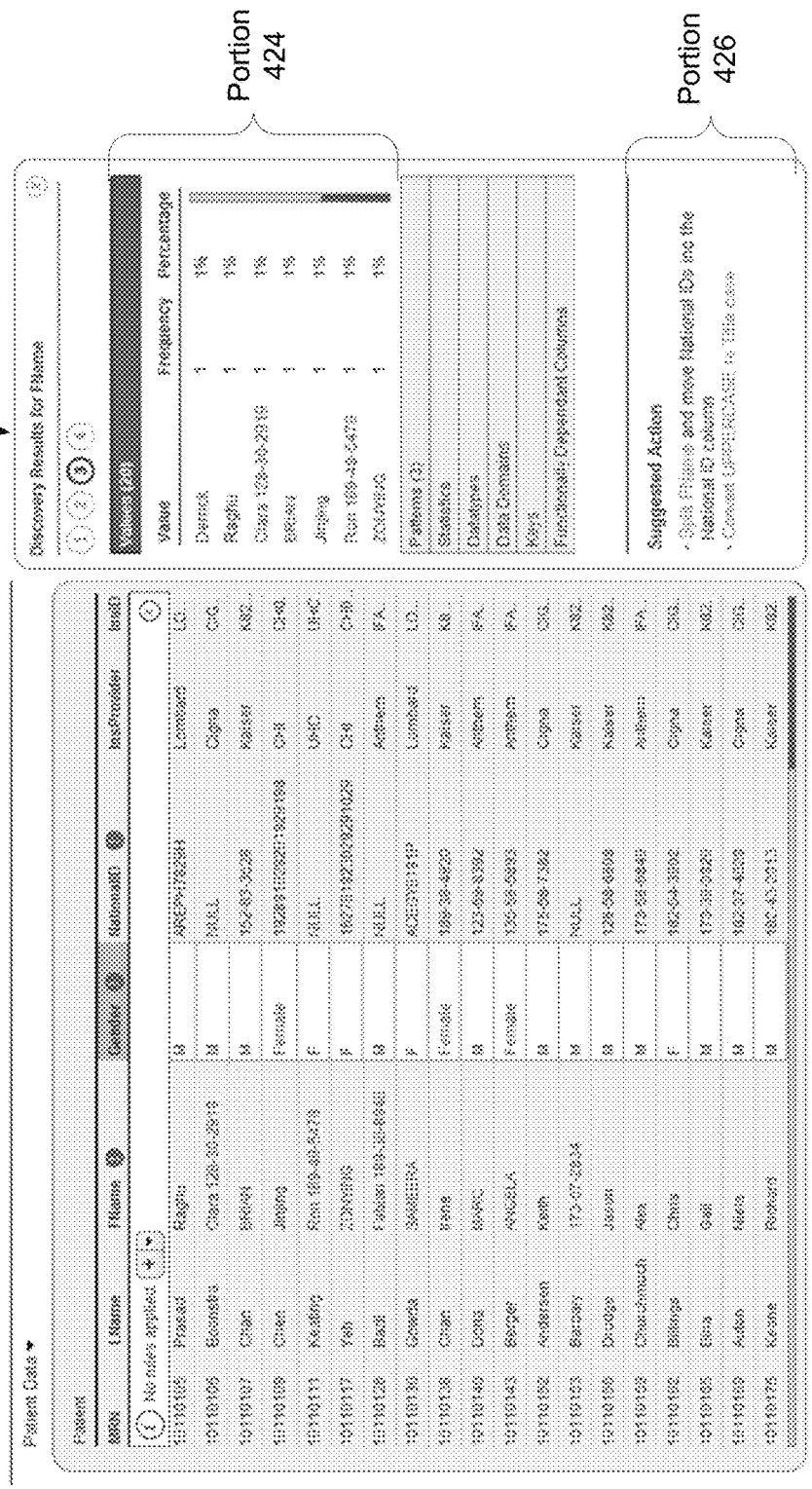
FIG. 4D illustrates another example of a grid column summary associated with the grid column according to one embodiment.

FIG. 4D illustrates another example of a grid column summary 420 associated with the grid column 422 according to one embodiment. In operation, when a user interacts with the grid column 422, by clicking on the portion of the grid header 302 associated with the grid column 422 for example, the grid UI module 122 generates the grid column summary 420 associated with the grid column 422. The grid column summary 420 includes a summary of the values included in the grid cells of the grid column 422, the 'First Name' column. Specifically, the grid column summary 420 specifies in portion 424 the different values included in the grid cells as well as the occurrence rates of those values in the grid cells. In the illustrated example, the portion 416 specifies that twenty different values appear in the grid column 402, including 'Clara 128-30-2919,' 'BRIAN' and 'Jinjing.' 'Clara 128-30-2919' and 'BRIAN' are, among others, highlighted in portion 416 to indicate that grid cells having these values correspond to data fields of the server table having validation statuses that indicate errors. The grid column summary 420 also specifies in portion 426 any transformations identified by the data validation module 110 that can be applied to the column or the data fields therein to correct the errors. In the illustrated example, the portion 426 specifies that transforming the 'First Name' column such that values in some data fields are split between the 'First Name' column and the 'National ID' and values in some data fields are converted to lower case would correct the identified errors.

Returning to FIG. 2, the transformation UI module 124 provides 210 one or more transformation controls for transforming data in the grid structure. Specifically, the transformation UI module 124 provides transformation controls that allow a user of the data profiling application 125 to select, specify and/or cause the application of transformations associated with one or more grid columns. A transformation specifies how values in the grid cells included in the associated grid columns are to be modified to correct the identified errors.

Figure 5A:
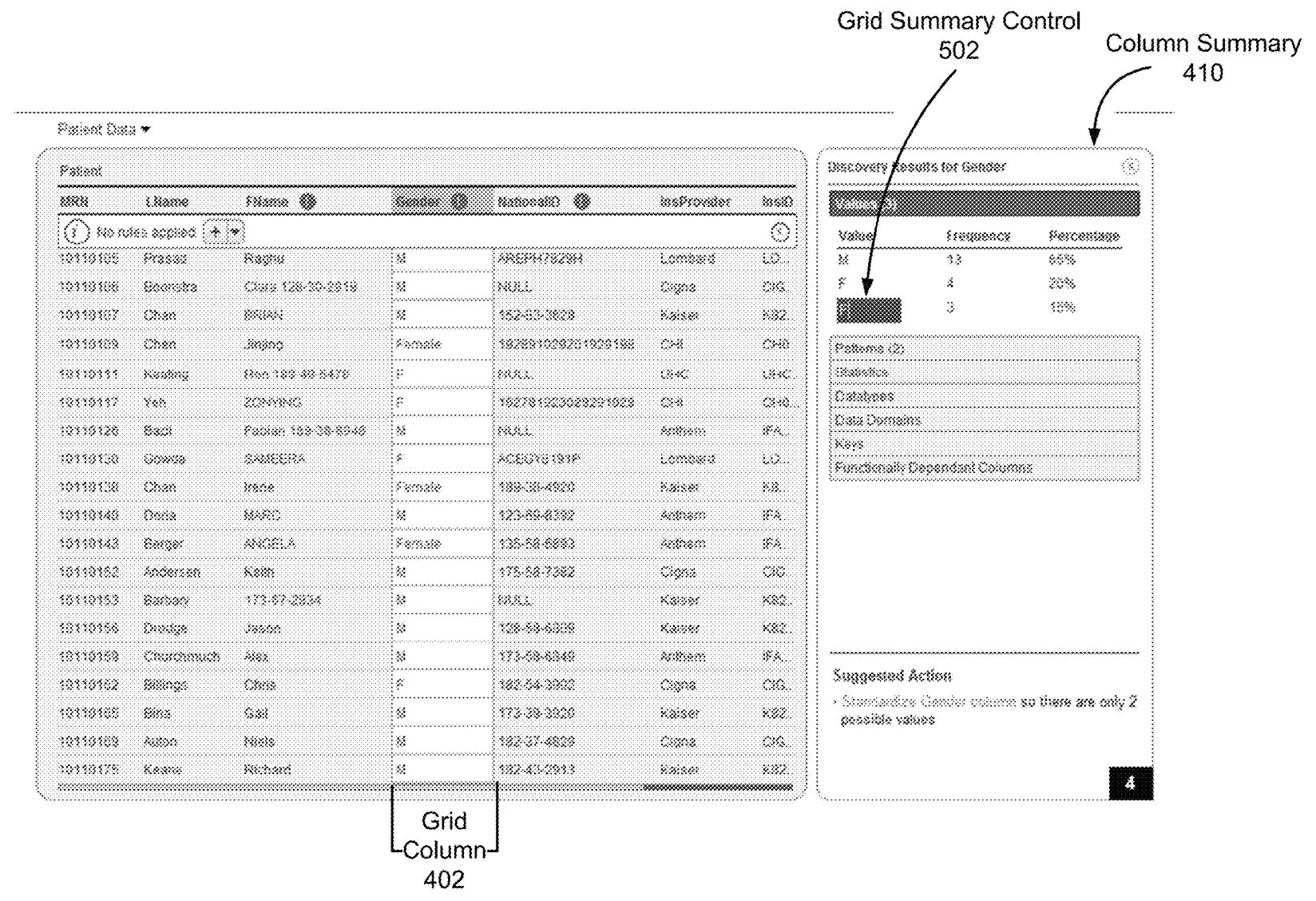

FIG. 5A illustrates a grid column summary control 502 provided by the transformation UI module 124 in the grid column summary 410 according to one embodiment. The grid column summary control 502 allows the user to specify in the column summary 410 a transformation to grid cells having certain values. When the transformation is applied to the grid cells, the values of the grid cells are modified accordingly. In the illustrated example, the values of the grid cells having the value 'Female' would be modified to 'F' instead. In such a manner, the user can easily view the different values in the grid column 402 as provided by the grid column summary 410 and, in the same view, specify a transformation that corrects values that are inconsistent.

Figure 5B:
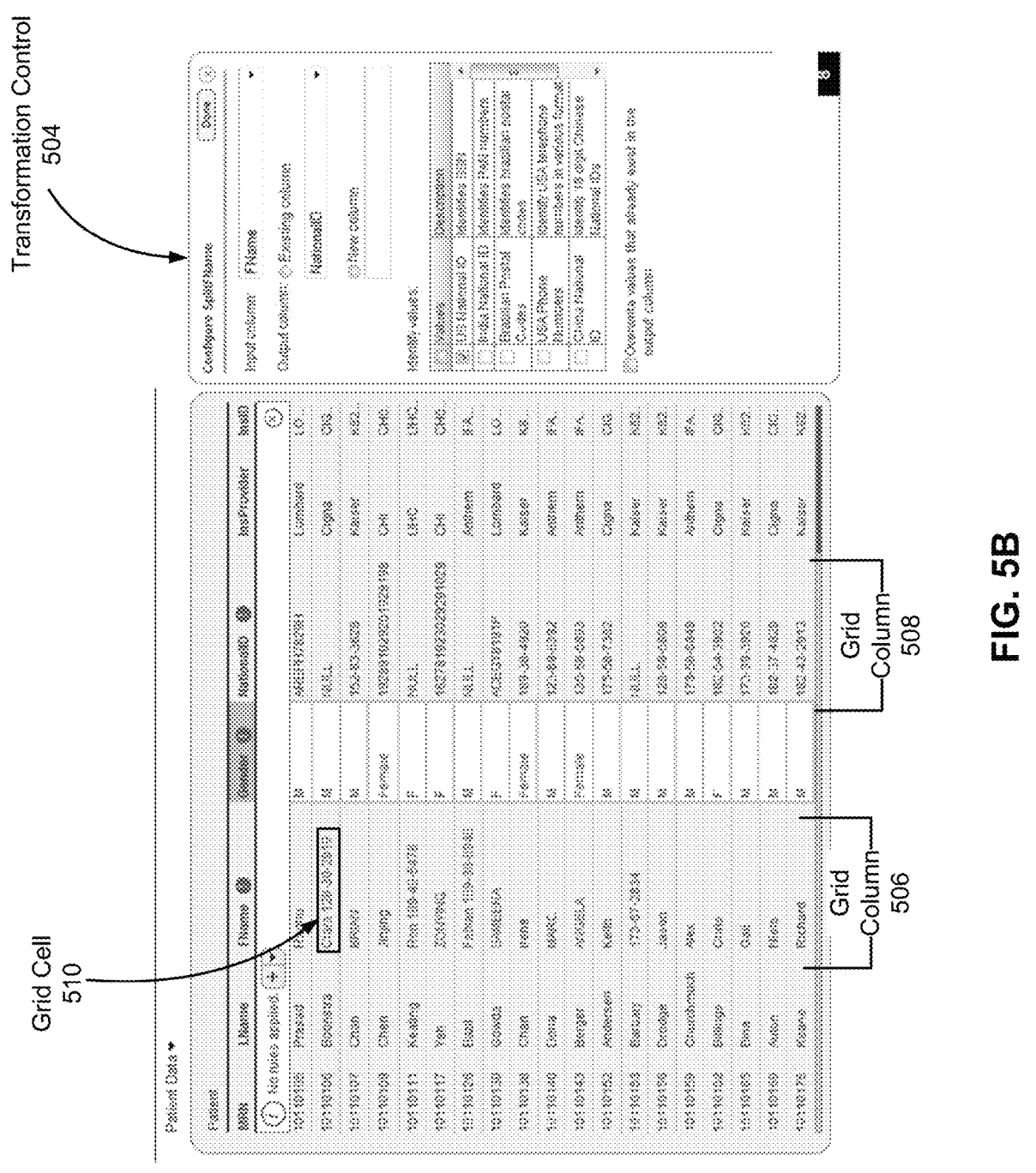

FIG. 5B illustrates transformation control 504 provided by the transformation UI module 124 according to one embodiment. The transformation control 504 allows the user to specify a transformation to be applied to the grid column 506. More specifically, the transformation control 504 allows the user to configure a split transformation that splits values in the grid cells included in an input column across both the input column and an output column. In the illustrated example, the split transformation, when applied to the grid column 506, would split the value in grid cell 510, i.e., 'Clara 128-30-2919,' into two portions and store 'Clara' in the 'First Name' grid column 506 and '128-30-2919' in the 'National ID' grid column 508.

Figure 5C:
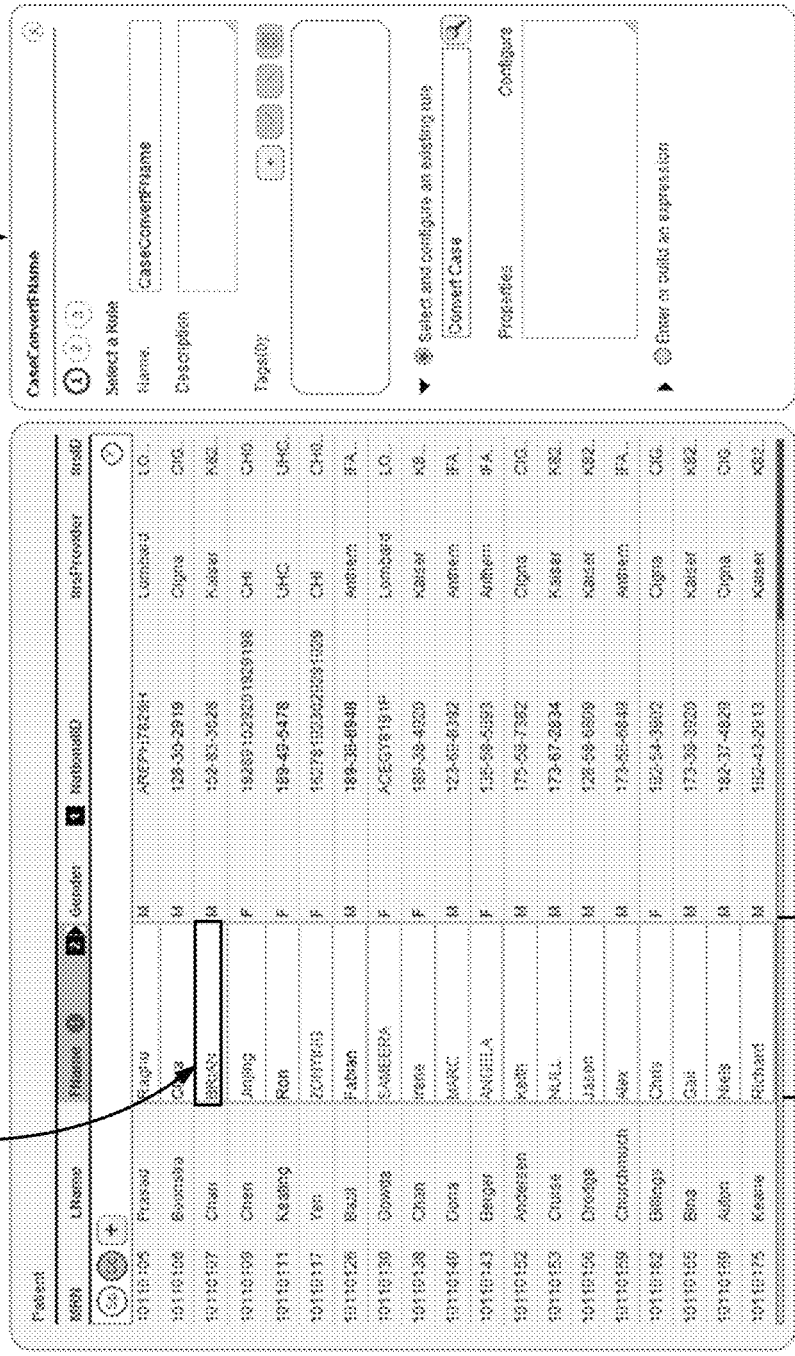
FIG. 5C illustrates another transformation control provided by the transformation UI module according to one embodiment.

FIG. 5C illustrates an in-cell transformation control 512 provided by the transformation UI module 124 according to one embodiment. The transformation control 512 allows the user to specify another transformation to be applied to the grid column 506. More specifically, the transformation control 512 allows the user to configure a case conversion transformation that converts uppercase values in the grid cells included in the grid column 506 to lowercase values. In the illustrated example, the case conversion transformation, when applied to the grid column 506, would convert the uppercase value in grid cell 514, i.e., 'BRIAN,' to lower case value 'Brian.'

Figure 5D:
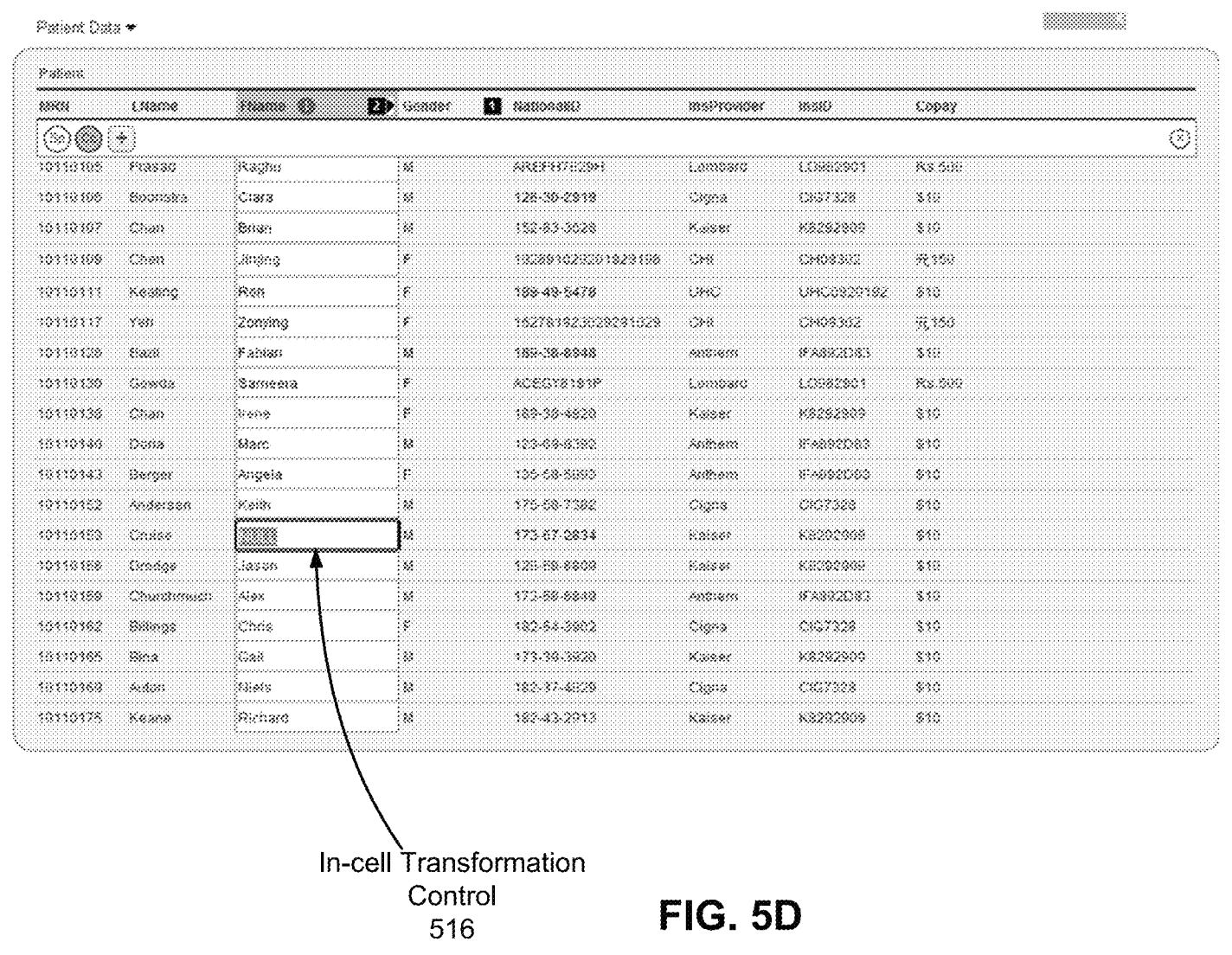

FIG. 5D illustrates another transformation control 516 provided by the transformation UI module 124 according to one embodiment. The transformation control 516 allows the user to specify a manual transformation of a value in a grid cell directly on the grid column 506. In the illustrated example, the manual transformation, when applied to the grid column 506, would convert the 'NULL' value into a value specified in the transformation control 516.

Returning back to FIG. 2, once the user has specified a transformation to be applied to a grid column using one of the various transformation controls provided by the transformation UI module 124, the transformation UI module 124 performs the transformation on the grid cells in the grid column. For each transformation performed, the transformation UI module 124 transmits 214 the transformation state associated with the transformed grid column to the state management module 112 in the data profiling server 104. The transformation state indicates the particular transformation that was applied to the grid column as a whole or to the grid cells therein.

The state management module 112 determines the mapping between the transformed grid cells and the data fields in the server table. As discussed above, each grid cell corresponds to a particular data field in the server table stored in the target data store 116. Once the mappings are determined, the state management module 112 stores in the transformation history store 120 the transformation state for each data cell in association with the corresponding data field. As discussed above, the transformations applied to data fields over time are captured in the transformation history store 120 and the state of the data field before or after any particular transformation can be recreated.

The transformation UI module 124 also provides the user with the ability to visualize the transformations applied to a particular grid column over time. More specifically, transformation UI module 124, upon user request, retrieves the transformation states associated with a given grid column from the transformation history store 120 and generates a transformation history view that is presented to the user. The transformation history view identifies the different transformations applied to the grid cells included in the grid column and the state of the grid cells before and after each transformation was applied. In one embodiment, the transformation history view is embedded in the grid interface generated by the grid UI module 122.

Figure 6:
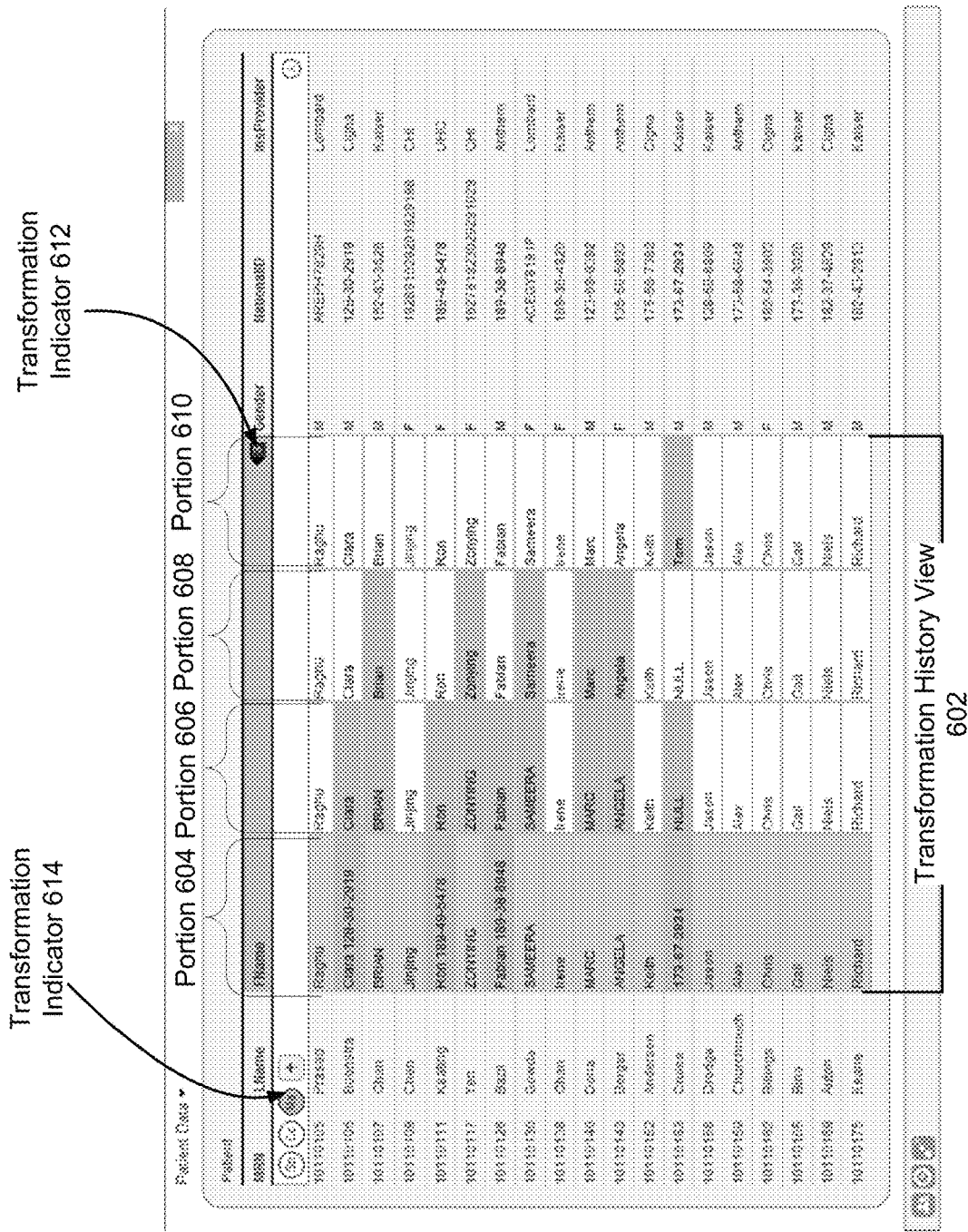
FIG. 6 illustrates a transformation history view associated with the grid column according to one embodiment.

FIG. 6 illustrates a transformation history view 602 associated with the grid column 506 according to one embodiment. The transformation history view 602 includes four portions, portion 604, 606, 608, and 610. Each portion corresponds to a historical state associated with the grid column 412 at a given time. Specifically, portion 604 corresponds to the original state of the grid column 506. Portion 606 corresponds to the state of the grid column 506 after the split transformation illustrated in FIG. 5B was applied to the grid column 506. Portion 608 corresponds to the state of the grid column 506 after the case transformation illustrated in FIG. 5C was applied to the grid column 506. Finally, portion 608 corresponds to the state of the grid column 506 after the manual transformation illustrated in FIG. 5D was applied to the grid column 412.

In this view, the grid interface also includes transformation indicators 612 and 614. Transformation indicator 612 indicates the total number of transformations that have been applied to grid column 412. In this case, the transformation indicator 612 indicates that '3' transformations have been applied. Transformation indicator 614 indicates an abbreviation of a particular type of transformation that has been applied to the grid column 412. In this case, the transformation indicator 614 indicates 'Ma,' which is an abbreviation for 'Manual' and corresponds to the manual transformation illustrated in FIG. 5D. Indicators 612 and 614 may be selectable such that the transformation history view 602 is presented when either the indicator 612 or 614 is selected.

The transformation UI module 124 also provides the user with the ability to visualize the transformations applied to an entire grid interface over time. More specifically, transformation UI module 124, upon user request, retrieves the transformation states associated with a grid interface and generates a pipeline view that is presented to the user. The pipeline view identifies whether data in the server table corresponding to the grid interface was extracted from data sources 102 and identifies any tables that were joined to create the server table. The pipeline view also identifies the different transformations applied to the grid columns. In one embodiment, the pipeline view is displayed concurrently with the grid interface.

Figure 7A:
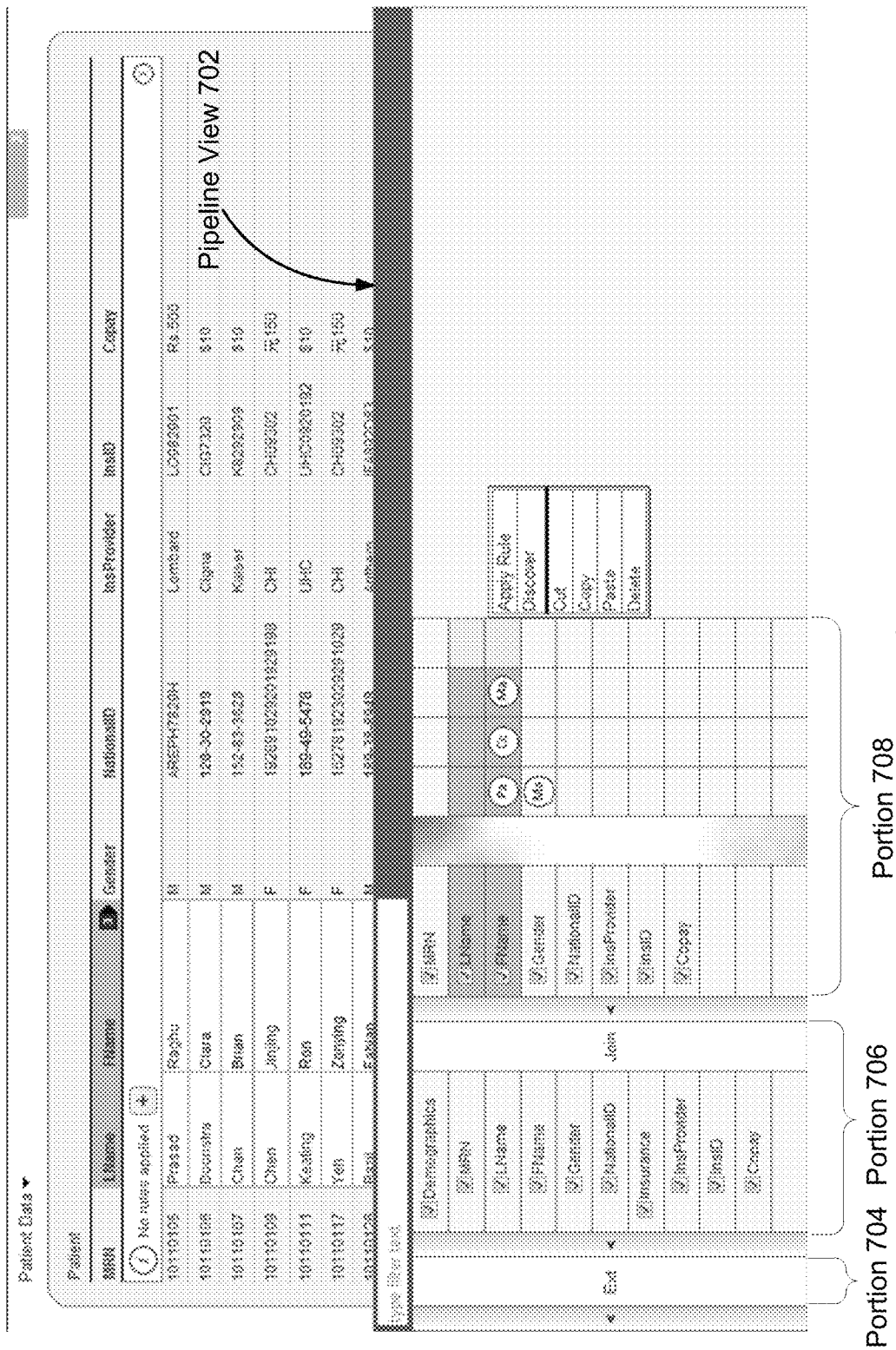
FIG. 7A illustrates a pipeline view associated with the grid interface according to one embodiment.

FIG. 7A illustrates a pipeline view 702 associated with the grid interface 300 according to one embodiment. The pipeline view 702 includes the external source portion 704, the internal source portion 706 and the transformation portion 708. The external source portion 704 indicates whether the server table stores data retrieved from external sources. The internal source portion 706 indicates whether one or more tables in the target data store 116 were joined to generate the server table. The transformation portion 708 indicates the different transformations that have been applied to the grid columns in the grid interface 300 corresponding to the server table. In one embodiment, a selection in the pipeline view 702 automatically results in a selection in the grid interface 300.

Figure 7B:
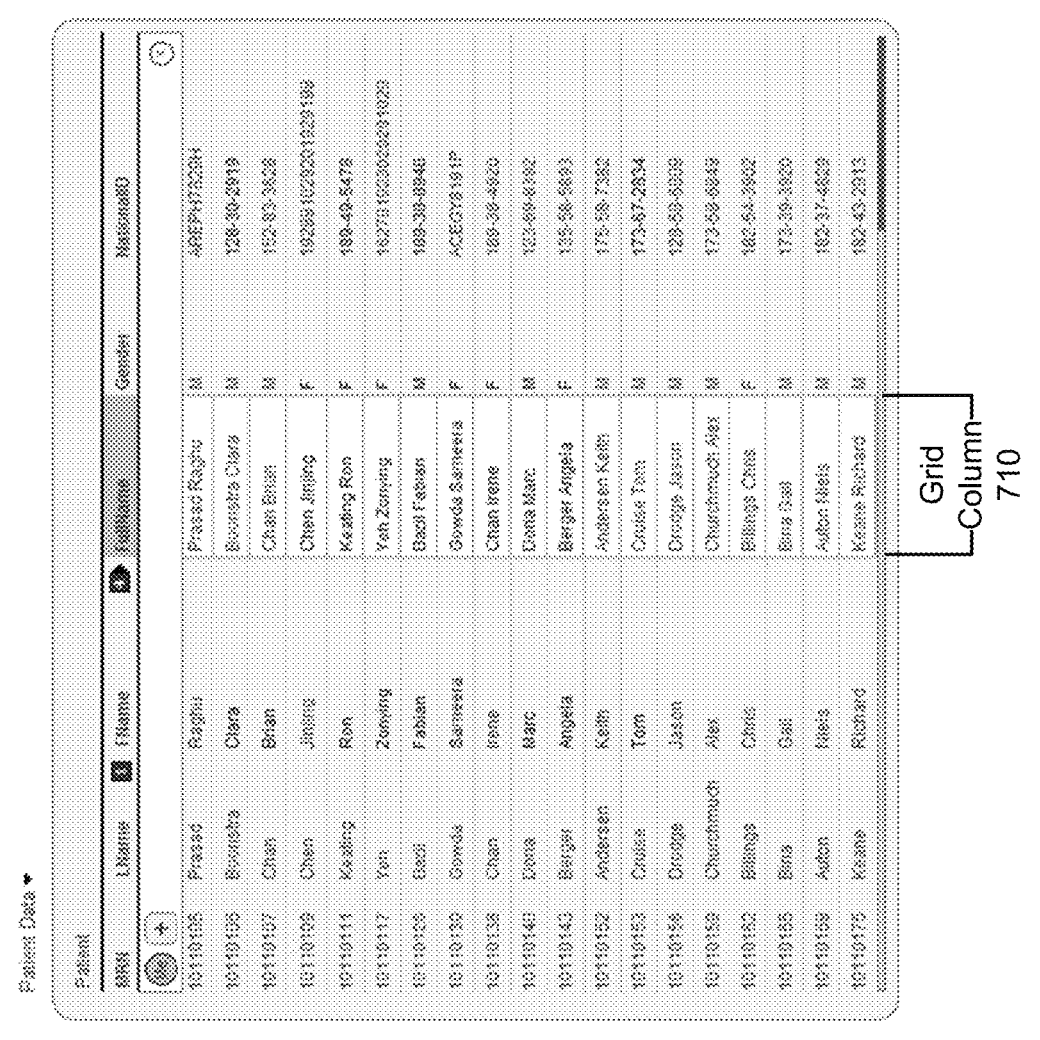

The pipeline view 702 allows the user to apply a merge transformation to two or more grid columns in the grid interface. In the illustrated example, the user has selected first name and the last name grid columns for merging. FIG. 7B illustrates the grid interface 300 after the merge transformation specified in FIG. 7A is applied according to one embodiment. As shown, the grid interface now includes the full name column 710 that was generated as a result of merging the first name grid column and the last name grid column.

The transformation UI module 124 also provides the user with the ability to visualize the transformations applied to grid column in a list view. More specifically, transformation UI module 124, upon user request, retrieves the transformation states associated with a given grid column and generates a transformation list view that is presented to the user. The transformation list view identifies all of the transformations applied to the grid column over time. The transformation list view, for each transformation, may also specify grid rows and/or other grid columns that were affected by the transformation. In one embodiment, the order of transformations listed in the transformation list view indicates the order in which the transformations were applied to the grid column.

Figure 8:
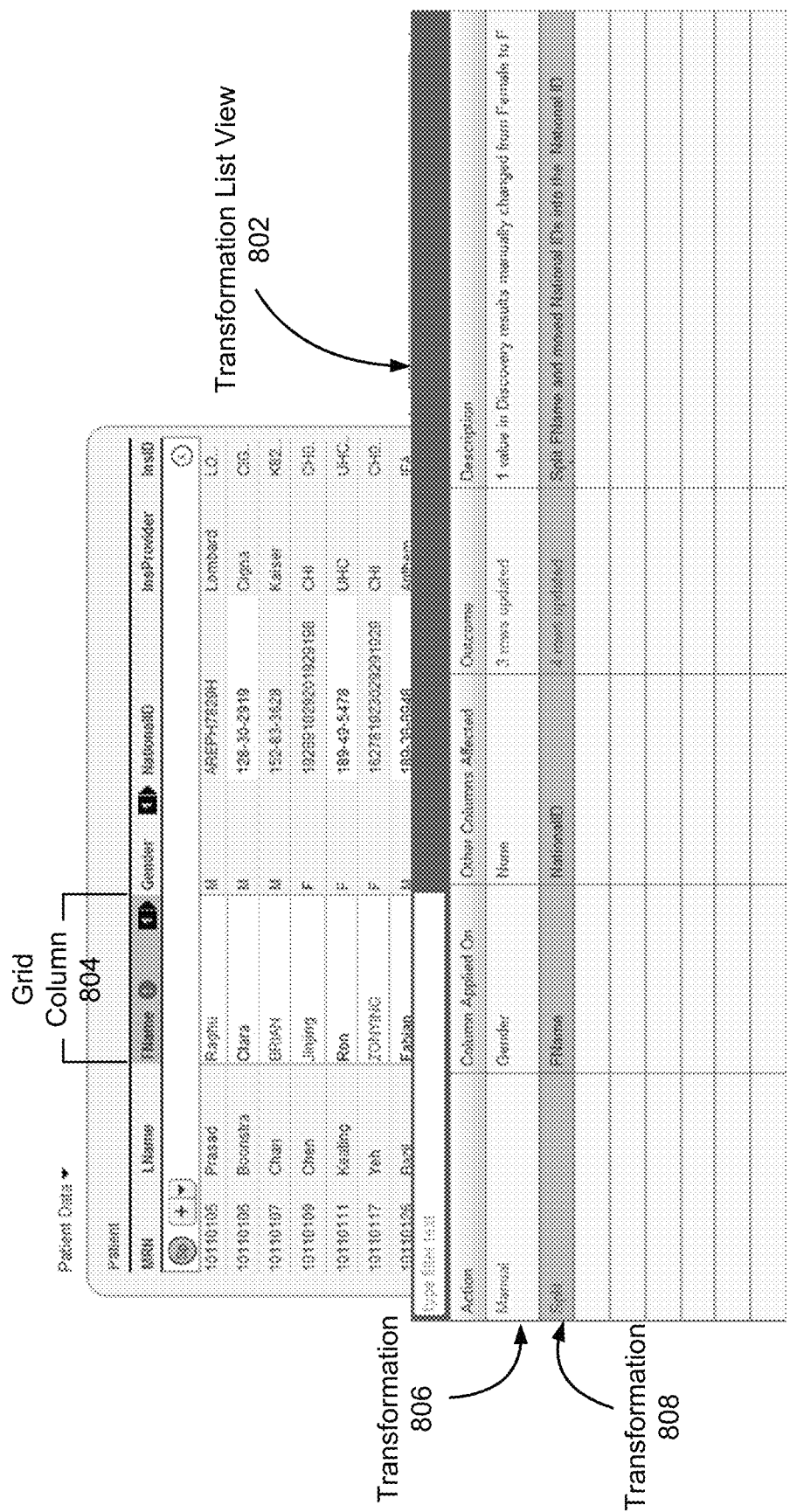
FIG. 8 illustrates a transformation list view associated with grid column according to one embodiment.

FIG. 8 illustrates a transformation list view 802 associated with grid column 804 according to one embodiment. The transformation list view 802 includes a list of all of the transformations applied to the grid column 804. For example, transformation 806 indicates that a manual transformation was applied to the grid column 804. Similarly, transformation 808 indicates that a split transformation was applied to the grid column 804.

Additional Configuration Considerations

The system described herein may be implemented using a single computer, or a network of computers, including cloud-based computer implementations. The computers are preferably server class computers including one or more high-performance CPUs and 1 G or more of main memory, as well as 500 Gb to 2 Tb of computer readable, persistent storage, and running an operating system such as LINUX or variants thereof. The operations of the system as described herein can be controlled through a combination of hardware and computer programs installed in computer storage and executed by the processors of such servers to perform the functions described herein. The system 100 includes other hardware elements necessary for the operations described here, including network interfaces and protocols, input devices for data entry, and output devices for display, printing, or other presentations of data, but which are not shown here in order to avoid obscuring the relevant details of the embodiments.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein, the term "module" refers to computer program logic utilized to provide the specified functionality. Thus, a module can be implemented in hardware, firmware, and/or software. In one embodiment, program modules are stored on a storage device, loaded into memory, and executed by a processor. Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for determining similarity of entities across identifier spaces. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method executed by one or more computing devices on a computer network for tracking data transformations applied to data extracted from one or more data sources on the computer network, the method comprising:

identifying, by at least one of the one or more computing devices, one or more errors in one or more extracted columns of data based at least in part on one or more validation rules associated with the one or more extracted columns of data, the one or more extracted columns of data being extracted from the one or more data sources on the computer network;

generating, by at least one of the one or more computing devices, one or more transformed columns of data by applying one or more data transformations to each extracted column of data in the one or more extracted columns of data to correct the one or more errors;

storing, by at least one of the one or more computing devices, a transformation history corresponding to each extracted column of data in the one or more extracted columns of data, the transformation history comprising one or more previous states, each previous state indicating a value of cells in that extracted column of data prior to each data transformation in the one or more data transformations;

transmitting, by at least one of the one or more computing devices, the one or more transformed columns of data in one or more grid columns of a grid structure in a user interface, the grid structure comprising one or more transformation indicators corresponding to the one or more grid columns, each transformation indicator being linked to a corresponding transformation history;

receiving, by at least one of the one or more computing devices, a selection of a transformation indicator in the one or more transformation indicators, the selected transformation indicator corresponding to a transformed column in the one or more transformed columns; and responsive to the selection of the transformation indicator, transmitting, by at least one of the one or more computing devices, an expanded grid structure comprising one or more previous state columns, each previous state column corresponding to a different previous state in the one or more previous states associated with the corresponding transformed column, each grid cell of each previous state column having a value associated with the different previous state.

2. The method of claim 1, wherein generating one or more transformed columns of data by applying one or more data transformations to each extracted column of data in the one or more extracted columns of data to correct the one or more errors comprises:

determining, for an extracted column in the one or more extracted columns, one or more recommended transformations configured to correct the one or more errors in the extracted column; and applying at least one recommended transformation in the one or more recommended transformations to the extracted column to generate a transformed column in the one or more transformed columns.

3. The method of claim 2, applying at least one recommended transformation in the one or more recommended transformations to the extracted column to generate a transformed column in the one or more transformed columns comprises:

transmitting the extracted column in a corresponding grid column of the one or more grid columns of the grid structure;

transmitting a column summary that identifies the one or more errors in the extracted column corresponding to the grid column and the one or more recommended transformations for the extracted column corresponding to the grid column; and applying at least one recommended transformation in the one or more recommended transformations to the extracted column to generate the transformed column.

4. The method of claim 2, wherein applying at least one recommended transformation in the one or more recommended transformations to the extracted column to generate the transformed column comprises:

transmitting a transformation control configured to receive a selection of a data transformation rule and to cause application of the selected data transformation rule to the extracted column, wherein the selected transformation rule determines how the extracted column data is transformed;

receiving, via the transformation control, a selection of at least one data transformation rule corresponding to the at least one recommended transformation; and applying the at least one data transformation rule to the extracted column to generate the transformed column.

5. The method of claim 4, wherein the transformation control is embedded in the grid structure.

6. The method of claim 4, wherein storing a transformation history corresponding to each extracted column of data in the one or more extracted columns of data comprises:

updating a transformation history corresponding to the extracted column to add a new previous state corresponding to values of cells in the extracted column prior to application of the at least one data transformation rule.

7. The method of claim 1, wherein the transformation history corresponding to each extracted column further comprises a list of one or more previous transformations applied to the extracted column.

8. An apparatus on a computer network for tracking data transformations applied to data extracted from one or more data sources on the computer network, the apparatus comprising:

one or more processors; and one or more memories operatively coupled to at least one of the one or more processors and having instructions stored thereon that, when executed by at least one of the one or more processors, cause at least one of the one or more processors to:

identify one or more errors in one or more extracted columns of data based at least in part on one or more validation rules associated with the one or more extracted columns of data, the one or more extracted columns of data being extracted from the one or more data sources on the computer network;

generate one or more transformed columns of data by applying one or more data transformations to each extracted column of data in the one or more extracted columns of data to correct the one or more errors;

store a transformation history corresponding to each extracted column of data in the one or more extracted columns of data, the transformation history comprising one or more previous states, each previous state indicating a value of cells in that extracted column of data prior to each data transformation in the one or more data transformations;

transmit the one or more transformed columns of data in one or more grid columns of a grid structure in a user interface, the grid structure comprising one or more transformation indicators corresponding to the one or more grid columns, each transformation indicator being linked to a corresponding transformation history;

receive a selection of a transformation indicator in the one or more transformation indicators, the selected transformation indicator corresponding to a transformed column in the one or more transformed columns; and responsive to the selection of the transformation indicator, transmit an expanded grid structure comprising one or more previous state columns, each previous state column corresponding to a different previous state in the one or more previous states associated with the corresponding transformed column, each grid cell of each previous state column having a value associated with the different previous state.

9. The apparatus of claim 8, wherein the instructions that, when executed by at least one of the one or more processors, cause at least one of the one or more processors to generate one or more transformed columns of data by applying one or more data transformations to each extracted column of data in the one or more extracted columns of data to correct the one or more errors further cause at least one of the one or more processors to:
- determine, for an extracted column in the one or more extracted columns, one or more recommended transformations configured to correct the one or more errors in the extracted column; and
- apply at least one recommended transformation in the one or more recommended transformations to the extracted column to generate a transformed column in the one or more transformed columns.

10. The apparatus of claim 8, wherein the instructions that, when executed by at least one of the one or more processors, cause at least one of the one or more processors to apply at least one recommended transformation in the one or more recommended transformations to the extracted column to generate a transformed column in the one or more transformed columns further cause at least one of the one or more processors to:
- transmit the extracted column in a corresponding grid column of the one or more grid columns of the grid structure;
- transmit a column summary that identifies the one or more errors in the extracted column corresponding to the grid column and the one or more recommended transformations for the extracted column corresponding to the grid column; and
- apply at least one recommended transformation in the one or more recommended transformations to the extracted column to generate the transformed column.

11. The apparatus of claim 8, wherein the instructions that, when executed by at least one of the one or more processors, cause at least one of the one or more processors to apply at least one recommended transformation in the one or more recommended transformations to the extracted column to generate a transformed column in the one or more transformed columns further cause at least one of the one or more processors to:
- transmit a transformation control configured to receive a selection of a data transformation rule and to cause application of the selected data transformation rule to the extracted column, wherein the selected transformation rule determines how the extracted column data is transformed;
- receive, via the transformation control, a selection of at least one data transformation rule corresponding to the at least one recommended transformation; and
- apply the at least one data transformation rule to the extracted column to generate the transformed column.

12. The apparatus of claim 8, wherein the transformation control is embedded in the grid structure.

13. The apparatus of claim 8, wherein the instructions that, when executed by at least one of the one or more processors, cause at least one of the one or more processors to store a transformation history corresponding to each extracted column of data in the one or more extracted columns of data further cause at least one of the one or more processors to:
- update a transformation history corresponding to the extracted column to add a new previous state corresponding to values of cells in the extracted column prior to application of the at least one data transformation rule.

14. The apparatus of claim 8, wherein the transformation history corresponding to each extracted column further comprises a list of one or more previous transformations applied to the extracted column.

15. At least one non-transitory computer-readable medium storing computer-readable instructions that, when executed by one or more computing devices, cause at least one of the one or more computing devices to:
- identify one or more errors in one or more extracted columns of data based at least in part on one or more validation rules associated with the one or more extracted columns of data, the one or more extracted columns of data being extracted from the one or more data sources on computer network;
- generate one or more transformed columns of data by applying one or more data transformations to each extracted column of data in the one or more extracted columns of data to correct the one or more errors;
- store a transformation history corresponding to each extracted column of data in the one or more extracted columns of data, the transformation history comprising one or more previous states, each previous state indicating a value of cells in that extracted column of data prior to each data transformation in the one or more data transformations;
- transmit the one or more transformed columns of data in one or more grid columns of a grid structure in a user interface, the grid structure comprising one or more transformation indicators corresponding to the one or more grid columns, each transformation indicator being linked to a corresponding transformation history;
- receive a selection of a transformation indicator in the one or more transformation indicators, the selected transformation indicator corresponding to a transformed column in the one or more transformed columns; and
- responsive to the selection of the transformation indicator, transmit an expanded grid structure comprising one or more previous state columns, each previous state column corresponding to a different previous state in the one or more previous states associated with the corresponding transformed column, each grid cell of each previous state column having a value associated with the different previous state.

16. The at least one non-transitory computer-readable medium of claim 15, wherein the instructions that, when executed by at least one of the one or more computing devices, cause at least one of the one or more computing devices to generate one or more transformed columns of data by applying one or more data transformations to each extracted column of data in the one or more extracted columns of data to correct the one or more errors further cause at least one of the one or more computing devices to:
- determine, for an extracted column in the one or more extracted columns, one or more recommended transformations configured to correct the one or more errors in the extracted column; and
- apply at least one recommended transformation in the one or more recommended transformations to the extracted column to generate a transformed column in the one or more transformed columns.

17. The at least one non-transitory computer-readable medium of claim 15, wherein the instructions that, when executed by at least one of the one or more computing devices, cause at least one of the one or more computing devices to apply at least one recommended transformation in the one or more recommended transformations to the extracted column to generate a transformed column in the one or more transformed columns further cause at least one of the one or more computing devices to:

transmit the extracted column in a corresponding grid column of the one or more grid columns of the grid structure;

transmit a column summary that identifies the one or more errors in the extracted column corresponding to the grid column and the one or more recommended transformations for the extracted column corresponding to the grid column; and apply at least one recommended transformation in the one or more recommended transformations to the extracted column to generate the transformed column.

18. The at least one non-transitory computer-readable medium of claim 15, wherein the instructions that, when executed by at least one of the one or more computing devices, cause at least one of the one or more computing devices to apply at least one recommended transformation in the one or more recommended transformations to the extracted column to generate a transformed column in the one or more transformed columns further cause at least one of the one or more computing devices to:

transmit a transformation control configured to receive a selection of a data transformation rule and to cause application of the selected data transformation rule to the extracted column, wherein the selected transformation rule determines how the extracted column data is transformed;

receive, via the transformation control, a selection of at least one data transformation rule corresponding to the at least one recommended transformation; and apply the at least one data transformation rule to the extracted column to generate the transformed column.

19. The at least one non-transitory computer-readable medium of claim 15, wherein the transformation control is embedded in the grid structure.

20. The at least one non-transitory computer-readable medium of claim 15, wherein the instructions that, when executed by at least one of the one or more computing devices, cause at least one of the one or more computing devices to store a transformation history corresponding to each extracted column of data in the one or more extracted columns of data further cause at least one of the one or more computing devices to:

update a transformation history corresponding to the extracted column to add a new previous state corresponding to values of cells in the extracted column prior to application of the at least one data transformation rule.

21. The at least one non-transitory computer-readable medium of claim 15, wherein the transformation history corresponding to each extracted column further comprises a list of one or more previous transformations applied to the extracted column.

* * * * *